Dec. 8, 1931.   J. C. DRADER   1,835,476
GRINDING FIXTURE
Filed Aug. 14, 1929   3 Sheets-Sheet 1

Inventor
Joseph C. Drader

By Harness, Dickey & Pierce
Attorney

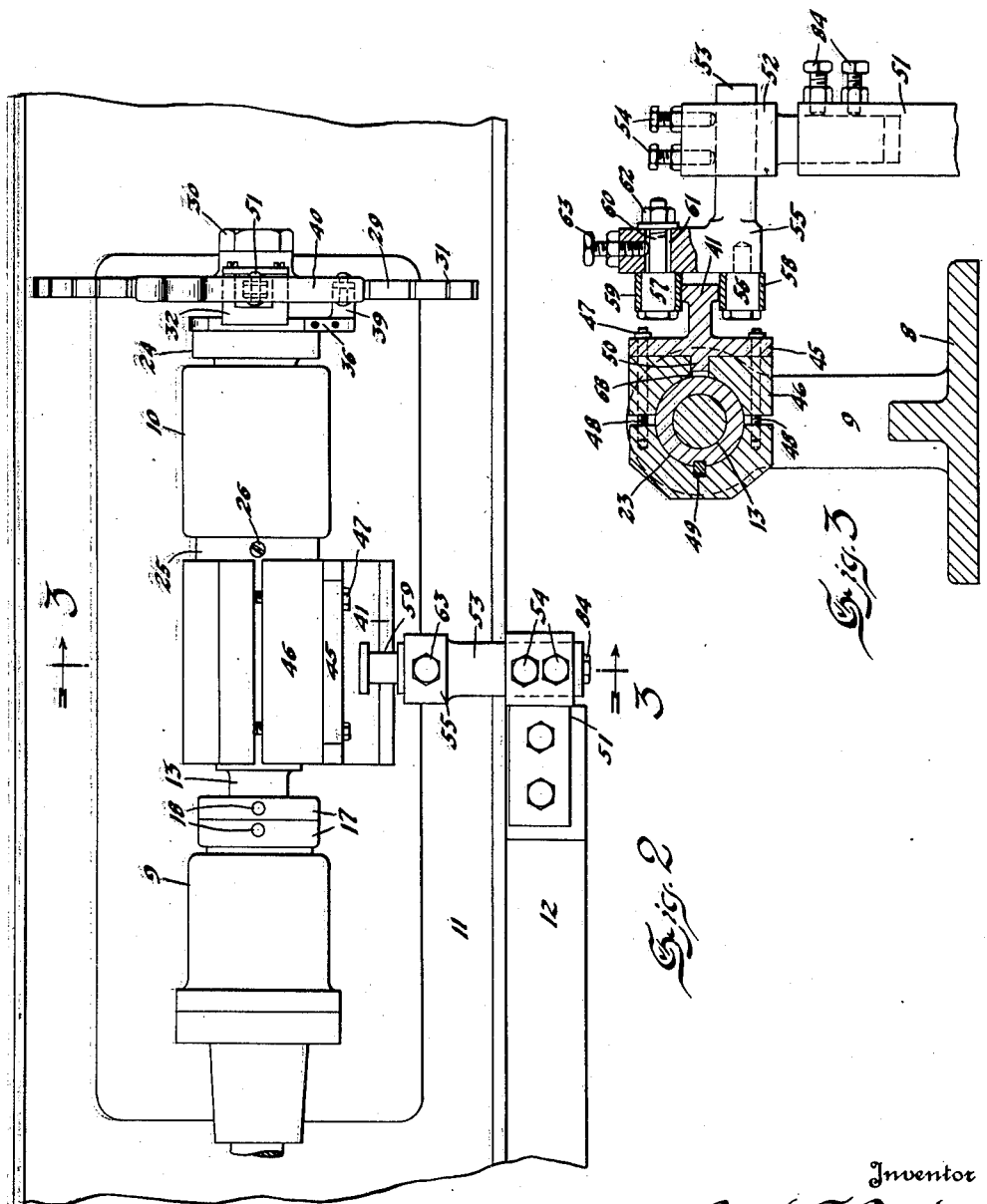

Dec. 8, 1931.   J. C. DRADER   1,835,476
GRINDING FIXTURE
Filed Aug. 14, 1929   3 Sheets-Sheet 3
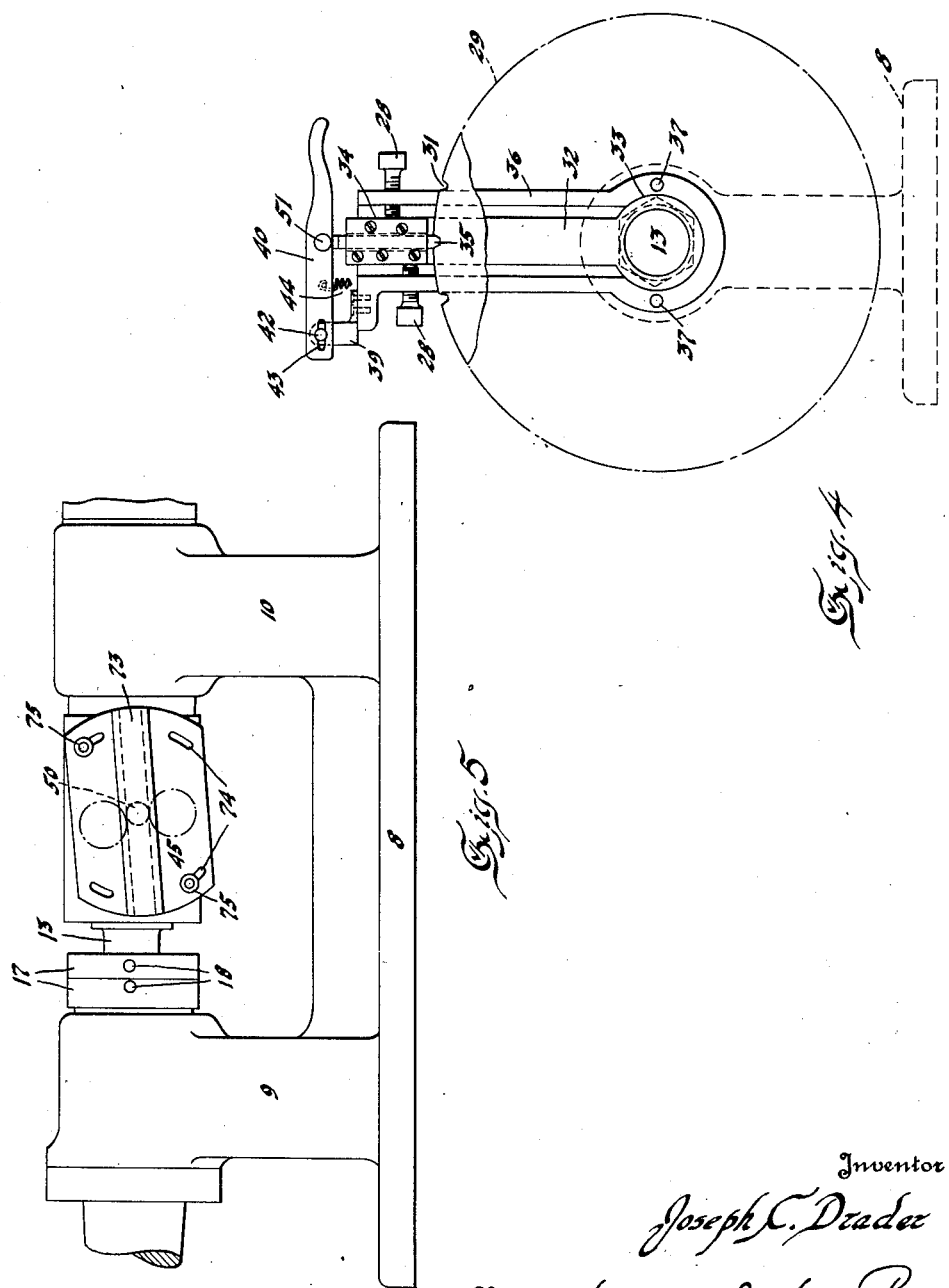

Patented Dec. 8, 1931

1,835,476

UNITED STATES PATENT OFFICE

JOSEPH C. DRADER, OF DETROIT, MICHIGAN, ASSIGNOR TO MICHIGAN TOOL COMPANY, A CORPORATION OF MICHIGAN

GRINDING FIXTURE

Application filed August 14, 1929. Serial No. 385,834.

This invention relates to grinding machines for grinding work units such as the cutters used in manufacturing helical worm gears, or worms themselves,—a principal object being the provision of grinding machines having very high efficiency and whose output is exceptionally accurate.

Another object is to provide a fixture for grinding a helical cutter by which a true helical contour may be obtained.

Another object is to provide a means whereby the cutter to be ground may be rotated while the carriage of the machine moves in a longitudinal direction during the working cycle.

Another object is to provide a means of adjustment whereby the cutter being machined may be turned in either direction to increase or decrease the depth of cut on the side of the teeth thereof.

The above being among the objects of the present invention, the same consists in certain novel features of construction and combinations of parts to be hereinafter described with reference to the accompanying drawings, and then claimed, having the above and other objects in view.

In the accompanying drawings which show a suitable embodiment of the present invention, and in which like numerals refer to like parts throughout the several different views;

Fig. 2 is a fragmentary plan view of Fig. 1.

Fig. 3 is a section taken on the line 3—3 of Fig. 2.

Fig. 4 is an end view of the dividing head showing its relation with respect to cooperating parts.

Fig. 5 is a fragmentary side elevation showing a modified form of construction of the track.

Figure 1:
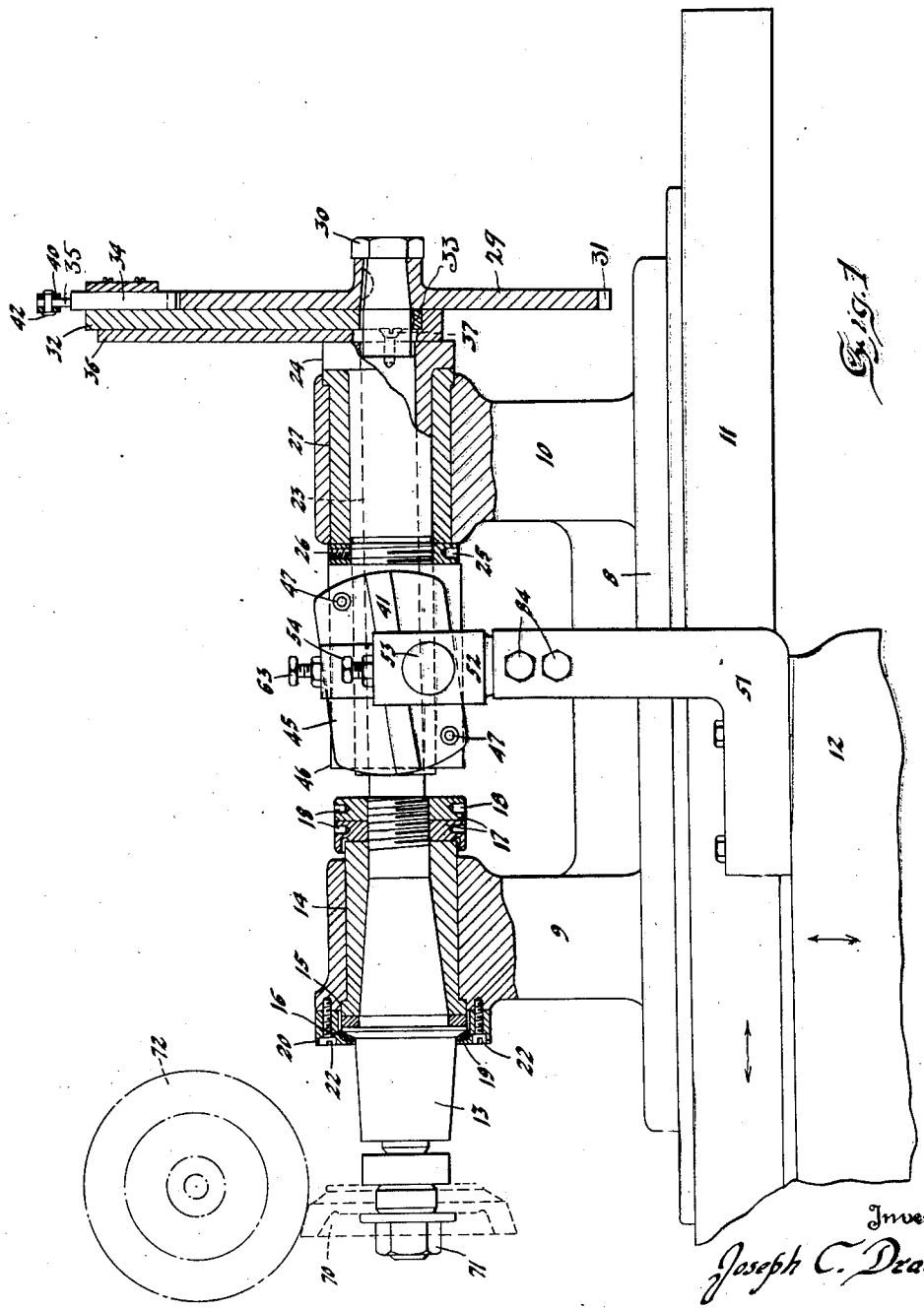
Fig. 1 is a side elevation of a grinding fixture with certain parts broken away to better illustrate the construction.

One present practice in machining helical cutters used for cutting helical gears is to set the cutter at an angle with the grinding wheel and to move the cutter in a longitudinal direction in a straight line and without rotation under the grinding wheel. It is apparent that, in such practice, the grinding wheel moves across the gear teeth in a straight line and therefore a true helix is not formed. In my present invention I form a true helix by rotating a work unit, such as a cutter which is being perfected, through any arc desired to form different helices thereon. My grinding fixture may also be easily adjusted for different depths of cuts. As indicated, a principal object of the device herein shown and claimed is to provide a grinding fixture that will automatically place and keep, the helical work unit that is to be cut in proper alignment with the grinding wheel during each longitudinal movement of the carriage in its working cycle. The attachment for adjusting the depth of cut is another important feature of this device,—because of its simplicity and ease of operation.

As illustrative of the present invention, I have shown in the accompanying drawings the base 8 of the grinding fixture having two upstanding pedestals 9 and 10 and secured to a movable carriage 11 which moves in the vertically movable bed 12 of a grinding machine of conventional construction. A shaft or spindle 13 is journalled in the pedestals 9 and 10 and extends the whole length of the grinding fixture. The tapered bushing 14 housed in the pedestal 9 and provided with a shoulder 15 cooperates with the tapered shoulder 16 on the shaft 13 and the lock nuts 17 to prevent axial movement of the shaft 13 relative to the fixtures. Apertures 18 are shown as formed in the lock nuts in order that a suitable tool may be applied to tighten them. An oil absorbent material 19 is preferably provided around the shoulder 16 and is shown as maintained in position by the collar 20 secured to pedestal 9 by the screws 22 and as protecting the bearing against entrance of foreign matter. A sleeve 23, rotatably received in the bushing 27 carried by the rear pedestal 10, rotatably receives the shaft 13 and is held against axial movement by a shoulder 24 and a lock nut 25 engaging the ends of the bushing 27, the lock nut 25 being secured against rotative movement relative to the shaft 13 by the set screw 26. Through the sleeve 23, motion is transmitted to the shaft through an adjustable dividing head constructed as follows, and as best shown in Fig. 4:

A disc-shaped dividing plate 29 is attached to the tapered end of the shaft 13 by the nut 30 and is provided with evenly spaced notches 31 around its periphery, the number of notches corresponding to the number of teeth on the object to be ground. An arm 32 is provided with a eye 33 rotatably surrounding the shaft 13 and is provided at its outer end with guiding ways 34 to guide a radially movable key 35 into its complementary notches 31 in the plate 29.

A radially extending arm 36 is secured against relative rotation to the flanged rear end of the sleeve 23 by screws 37. This arm 36 is of channel section and the arm 32 is received within the channel thereof, sufficient clearance being provided to permit a limited amount of rotational adjusting movement of the arm 32 about the axis of the shaft 13 between the sides of the channel. This adjusting movement of the arm 32 relative to the arm 36 is controlled by the screws 28 which thread through the sides of the channel and bear against opposite sides of the arm 32. A bracket 39 is attached to the outer end of the arm 36 and a lever 40 is pivoted to it by means of a pin 42 engaged in an elongated slot 43 in the lever 40. The lever 40 is also pivotally connected to the key 35 by means of a pin 51. The elongated slot 43 is provided to allow the position of the lever 40 to be shifted relative to the pin 42 when the inner arm 32 and attached key 35 are moved relative to the outer arm 36. Means such as a tension spring 44 may be provided to exert a downward force on the lever 40 thereby maintaining the key in operative relation with respect to the cooperating notch 31. It is apparent from the above construction that by manipulation of the screws 28, the inner arm which is locked against relative rotation to the disc 29 by the key 35 will rotate relative to the outer arm 36 which is secured against rotation to the sleeve 23, and inasmuch as the plate 29 is secured against relative rotation to the shaft 13, such manipulation of the screws 28 will cause a corresponding relative rotation between the shaft 13 and sleeve 23.

In Figs. 1 and 2 is best shown the mechanism for causing the rotative motion of the shaft 13 during the reciprocating motion of the carriage 11. A radially projecting track 41, preferably in the form of a helix provided with outwardly and oppositely disposed cam faces and corresponding in pitch with the helix of the cutter tooth to be ground, is attached to a base 45 which is secured to the bracket 46 by the screws 47. The bracket 46 is split and is clamped on the sleeve 23 by the stud bolts 48. A key 49 is provided between the bracket 46 and the sleeve 23 to prevent relative rotation of the bracket and the sleeve. The base 45 is provided with a pilot pivot 50 received in the opening 68 in the split bracket 45 to correctly locate the base 45 on the bracket. The pivotal relation of the base 45 with respect to the axis of the pilot is controlled by the screws 47 to maintain the axis of the track 41 concentric with the axis of the shaft 13, and the screws further serve to secure the base 45 to the bracket 46.

A longitudinally adjustable or other arm 51', adapted indirectly to carry cam elements such as relatively adjustable guide rollers respectively engaging opposite faces of track 41, may be attached to the bed 12 and be provided with a vertically extending member 52 which is rotatively and vertically slidably received therein, screws such as 84 being provided for locking the member 52 in adjusted position. A horizontally extending member 53 is slidably and rotatably received in the member 52 and screws such as 54 are provided for locking the member 53 in adjusted rotatable and slidable position. The member 53 is provided with a head 55 which carries the pins 56 and 57 upon which the rollers 58 and 59 are rotatably mounted. The lower pin 56 is threaded directly into the head 55 in a position to permit the roller 58 to engage the lower face of the track 41. The upper pin 57 is provided with a stud 60 which projects through the slot 61 in the head 55 and is secured therein by means of the nut 62 in a position to permit the roller 59 to engage the upper face of the track 41. This last construction, that is, the slot 61 and stud 60, is provided to permit the roller 59 to be adjusted towards and from the roller 58 to compensate for various thicknesses and angularities of the track. A screw 63 threaded in the head 55 and projecting into the slot 61 to bear against the stud 60 is provided to prevent accidental shifting of the roller 59 from its adjusted position.

Inasmuch as the rollers 58 and 59 will maintain any point of the track 41 engaged between them at a fixed distance from the bed 12 of the machine, and inasmuch as the track 41 is formed as a helix with its axis concentric with the axis of the shaft 13, it will be apparent that when the table 11 is moved on the bed 12, carrying the grinding fixture and therefore the track 41 with it, a rotational movement will be imparted to the track 41 about the axis of the shaft 13, and this rotational movement will be transmitted to the sleeve 23 and thence through the index head to the shaft 13, thus causing a corresponding rotational movement of the shaft 13.

In operation, a cutter such as 70 or other article to be ground, is fixed to the forward end of the shaft 13 by the nut 71, or other suitable means, and in a position to receive the grinding wheel 72 between two adjacent teeth. The table 11 is thereupon caused to reciprocate in the usual manner, carrying the grinding fixture, and therefore the cutter 70 back and forth with it under the grinding wheel 72. It will, of course, be obvious that in passing under the wheel 72, the cutter 70 will simultaneously rotate an amount governed by the pitch of the track 41 so that the teeth of the cutter will follow a helical path, and the sides of the teeth in being ground by the wheel 72 will be formed into a predetermined helical contour.

If a heavier or a lighter cut is required on the side face of the cutter tooth this may be taken care of by manipulating the screws 28 as previously described to cause the shaft 13, and therefore the cutter 72, to rotate relative to the sleeve 23 the desired amount in the desired direction independently of any movement of the shaft 13 as controlled by the track 41. The depth of contact of the wheel 72 and the cutter teeth may, of course, be adjusted in the conventional manner by vertical adjustment of one of these members, by means not shown.

When a side face of one cutter tooth is suitably finished in the above manner, the lever 40 may be moved to raise the key 35 out of the then engaged notch 31 in the dividing plate 29, and the plate 29 rotated until the next adjacent notch 31 is engaged by the key 35, which will thus cause rotation of the cutter 70 to bring the wheel 72 between the next adjacent teeth of the cutter 70, and the grinding operation then repeated.

With the above described construction, when a cutter having teeth of a different helical contour is to be cut, the base 45 carrying the track 41 must be removed and one then attached having an angle that will correspond to the new pitch to be formed. In the modified form of construction shown in Fig. 5, I have shown a means whereby the angles of the track 41 with relation to the axis of the shaft 13 may be changed to correspond with any pitch desired within a limited range. In the modification the base 45 is provided with a substantially straight track 73 and the base of the track may be swung around the pilot 50, so that the track 73 may be made to approximate the pitch of the desired helical contour of the cutter tooth. This swinging movement is provided by forming elongated arcuate slots 74 in the base 45 and having centers of curvature coincident with the axis of the pilot 50. The screws 75 extending through the slots 74 are provided to clamp the base when in the adjusted position required. By this means a large variation of helices may be formed with only a slight loosening of the screws 75 and required shifting of the base 45. This method may be satisfactorily employed where the cutters are not of excessive thickness and will result in a product of sufficient accuracy to be commercially acceptable.

Formal changes may be made in the specific embodiment of the invention described without departing from the spirit or substance of the broad invention, the scope of which is commensurate with the appended claims.

What I claim is:

1. Means for grinding a helically shaped cutter tooth comprising, in combination, a grinding wheel and a cutter supporting fixture adapted for movement relative to each other, said fixture comprising a shaft extending through spaced bearings and having a relative axial movement with respect to said wheel, means, including a sleeve extending through one of said bearings and also a projecting cam rail secured on said sleeve and providing parallel cam surfaces, for said wheel for imparting a rotary movement to said shaft upon said relative axial movement between said shaft and said wheel, and correspondingly spaced cam guide means cooperating with the respective cam surfaces of said rail.

2. Means for grinding a helically shaped cutter tooth comprising, in combination, a grinding wheel and a cutter supporting fixture adapted for movement relative to each other, means supporting said grinding wheel, said fixture comprising a shaft for supporting said cutter, said shaft having a relative axial movement with respect to said wheel, a cam track member providing faces oppositely engageable with spaced guide elements, a member providing spaced cam guide elements respectively engaging said faces, for imparting rotary movement to said shaft upon axial movement thereof relative to said wheel, one of said members being fixed relative to said shaft and the other of said members being fixed relative to said wheel supporting means, a sleeve surrounding said shaft to which the corresponding of said members is secured.

3. In a device of the type described, a stationary bed, a table longitudinally movable thereon, a grinding wheel fixed relative to said bed, a rotatable work-carrying shaft carried by said table and fixed against axial movement relative thereto, and means cooperating between bed and said shaft, and comprising a projecting rail adjustably secured upon said shaft for controlling the rotatable position of said shaft in accordance with the longitudinal position of said shaft relative to said grinding wheel,—said rail being provided with securing means which permit an adjustable variation in the inclination thereof relatively to the axis of said shaft.

4. In a device of the type described, a bed, a table longitudinally movable thereon, a grinding wheel, a rotatable work-carrying shaft carried by said table and fixed against axial movement relative thereto, and means cooperating between bed and said shaft for controlling the rotatable position of said shaft in accordance with the longitudinal position of said shaft relative to said grinding wheel,—said means comprising a projecting cam track adjustably fixed against movement relative to said shaft, and a plurality of spaced cooperating guide cam rollers adjustably fixed against movement relatively to said bed.

5. In a device of the type described, a bed, a table longitudinally movable thereon, a grinding wheel, a rotatable work-carrying shaft carried by said table and fixed against axial movement relative thereto, and means cooperating between said bed and said shaft for controlling the rotatable position of said shaft in accordance with the longitudinal position of said shaft relative to said grinding wheel,—said means comprising a projecting cam track adjustably fixed against movement relative to said shaft and a plurality of spaced cooperating guide rolls adjustably fixed against movement relatively to said bed, and said track being approximately helical with respect to the axis of said shaft and provided with oppositely and outwardly disposed cam faces, respectively engageable with said cam rolls.

6. In a device of the type described, a bed, a table longitudinally movable thereon, a grinding wheel, a rotatable work-carrying shaft carried by said table and fixed against axial movement relative thereto, and means cooperating between bed and said shaft for controlling the rotatable position of said shaft in accordance with the longitudinal position of said shaft relative to said grinding wheel, said means comprising a track distinct from said work and adjustably fixed against movement relative to said shaft and a cooperating guide adjustably fixed against movement relatively to said bed, said track being disposed in an approximately helical path with respect to the axis of said shaft, and said guide comprising a pair of rollers engaging opposite faces of said track.

7. In a device of the type described, a bed, a table longitudinally movable thereon, a grinding wheel, a rotatable work-carrying shaft carried by said table and fixed against axial movement relative thereto, and means cooperating between bed and said shaft for controlling the rotatable position of said shaft in accordance with the longitudinal position of said shaft relative to said grinding wheel, said means comprising a track distinct from said work and adjustably fixed against movement relative to said shaft and a cooperating guide fixed against movement relatively to said bed, said track being disposed in an approximately helical path with respect to the axis of said shaft, said guide comprising a pair of rollers engaging opposite faces of said track, and means for adjusting one of said rollers relative to the other thereof.

8. A device of the type described comprising a disc-shaped dividing head provided with equally spaced notches around its circumference, an axially fixed rotatable shaft connecting said dividing head and carrying an object to be ground, means connected to said dividing head to rotate the shaft during a working cycle, two cooperating arms rotatably mounted relative to said shaft and to each other, a retractable key guided by one of said arms and engaging one of said notches, and means to maintain the position of said key.

9. In a device of the type described, a bed, a table longitudinally movable thereon, a grinding wheel, a rotatable work-carrying shaft carried by said table and fixed against axial movement relative to said table, and means cooperating between bed and said shaft for controlling the rotatable position of said shaft in accordance with the longitudinal position of said shaft relative to said grinding wheel,—said means comprising a track, distinct from said work and having two cam faces, said track being adjustably fixed against movement relative to said shaft, and a cooperating cam guide adjustably fixed against movement relative to said bed, said track being disposed in an inclined path and adjustably secured with respect to the axis of said shaft, and said guide comprising a pair of rollers engaging opposite faces of said track, and means for adjusting said rollers in any desired relative position corresponding to a position of adjustment of said track.

10. A device of the type described comprising in combination, a base, a shaft journalled in said base and restrained against axial movement, a disc-shaped dividing plate attached to said shaft, two radially extending arms rotatably mounted relative to said shaft, one of said arms fitting within the other and being relatively rotatable with respect thereto, screw means in the side of said outer arm to secure said inner arm in a fixed position relative to the outer arm, means connecting the inner arm to move relative to the index plate, means to rotate the shaft during the longitudinal motion of said shaft, and a sleeve connecting the last mentioned means and the outer of said radially extending arms.

11. In combination with a grinding machine including a vertically movable bed, a grinding wheel and a carriage movable relative thereto, a grinding fixture for cutting helical toothed members comprising a base attached to said carriage, a shaft journaled in said base and fixed against axial movement relative thereto, a track concentric with said shaft, a stationary guide for said track, a sleeve surrounding said shaft and to which said track is secured, an outer radially extending arm attached against relative relation to said sleeve, an inner radially extending arm fitting in said outer arm, screw means to adjust said inner arm relative to the outer arm and to secure said inner arm against the free rotative movement relative to said outer arm, an index plate fixed to said shaft and having equally spaced notches around its periphery, said index plate moving relative to said outer arm and in fixed relation with respect to said inner arm, and means carried by said inner arm to engage said notches to cause said outer arm to move in fixed relation with said index plate.

12. In combination in a grinding fixture for a helical toothed cutter, a base, a shaft journalled in said base, a track distinct from said cutters mounted to move with said shaft and adjustable in angular relation to the axis of the shaft, rollers oppositely engaging said track, a dividing head mounted on said shaft, means to rotate said shaft relative to the track, and connecting means between said dividing head and said track.

13. In a device of the type described, a work supporting shaft, a cam track, distinct from said work secured to said shaft and extending at an angle to the axis thereof, a stationary supporting means, and cam rollers carried by said supporting means engaging opposite sides of said track.

14. In a device of the type described, a work supporting shaft, a sleeve mounted on said shaft, means constraining said sleeve to equal rotation with said shaft, a track member mounted on said sleeve and comprising a base and a track fixed thereto, said base being movable relative to said sleeve to vary the angular relation of said track with respect to the axis of said shaft, and stationary guiding means engaging said track.

JOSEPH C. DRADER.